June 22, 1948.   W. R. BRUCE   2,443,948
POWER PLANT
Filed July 8, 1946   7 Sheets-Sheet 3

Inventor
Warren R. Bruce
by
Attorney

June 22, 1948. W. R. BRUCE 2,443,948
POWER PLANT
Filed July 8, 1946 7 Sheets-Sheet 4
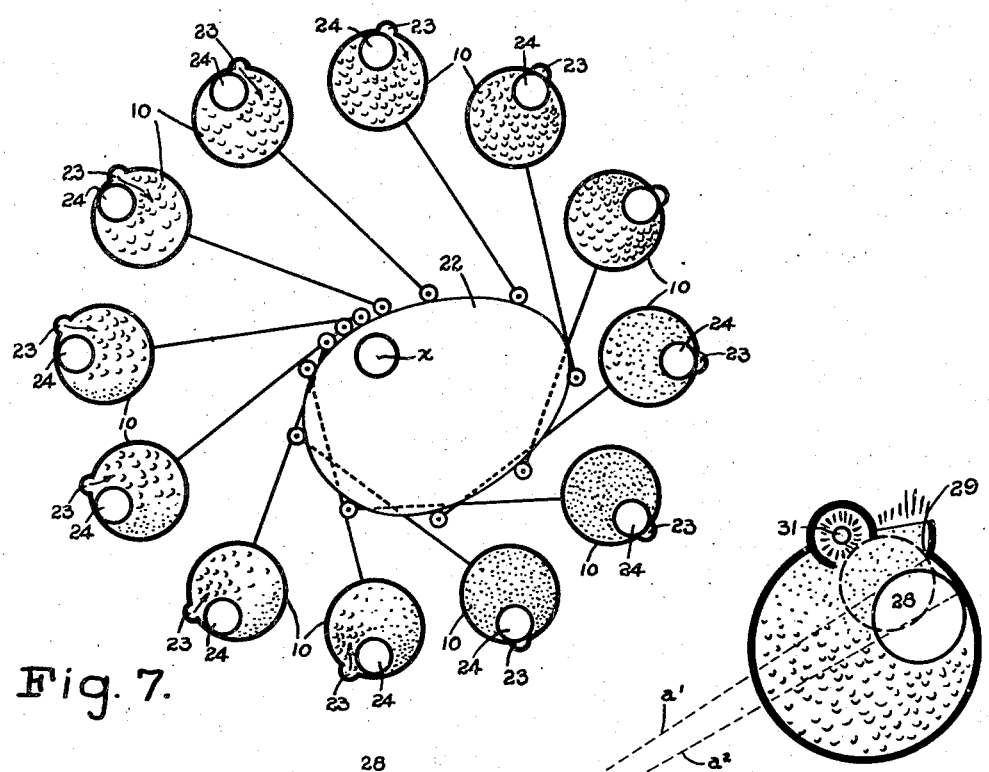
Fig. 7.
Fig. 9.
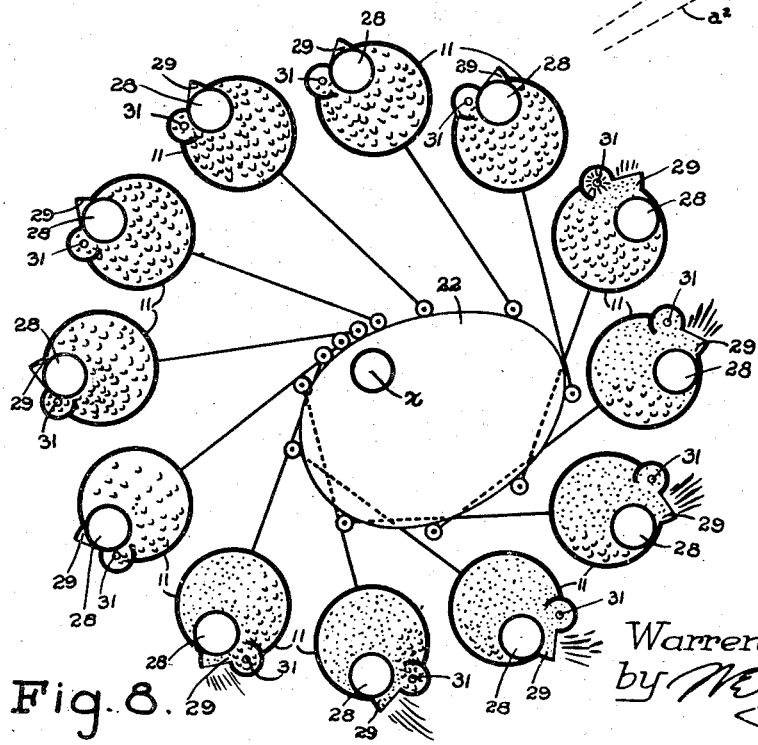
Fig. 8.
Inventor
Warren R. Bruce
by
Attorney

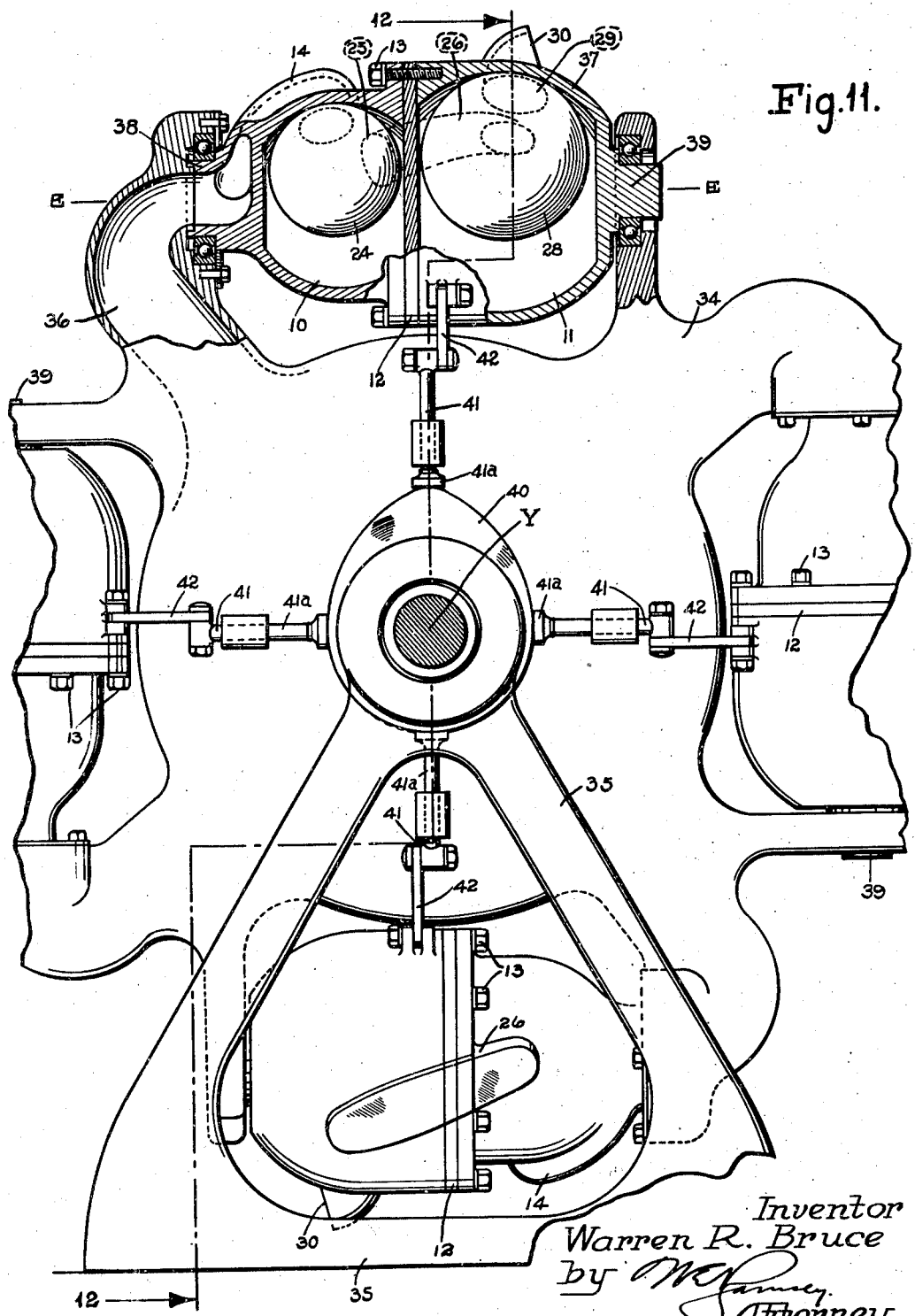

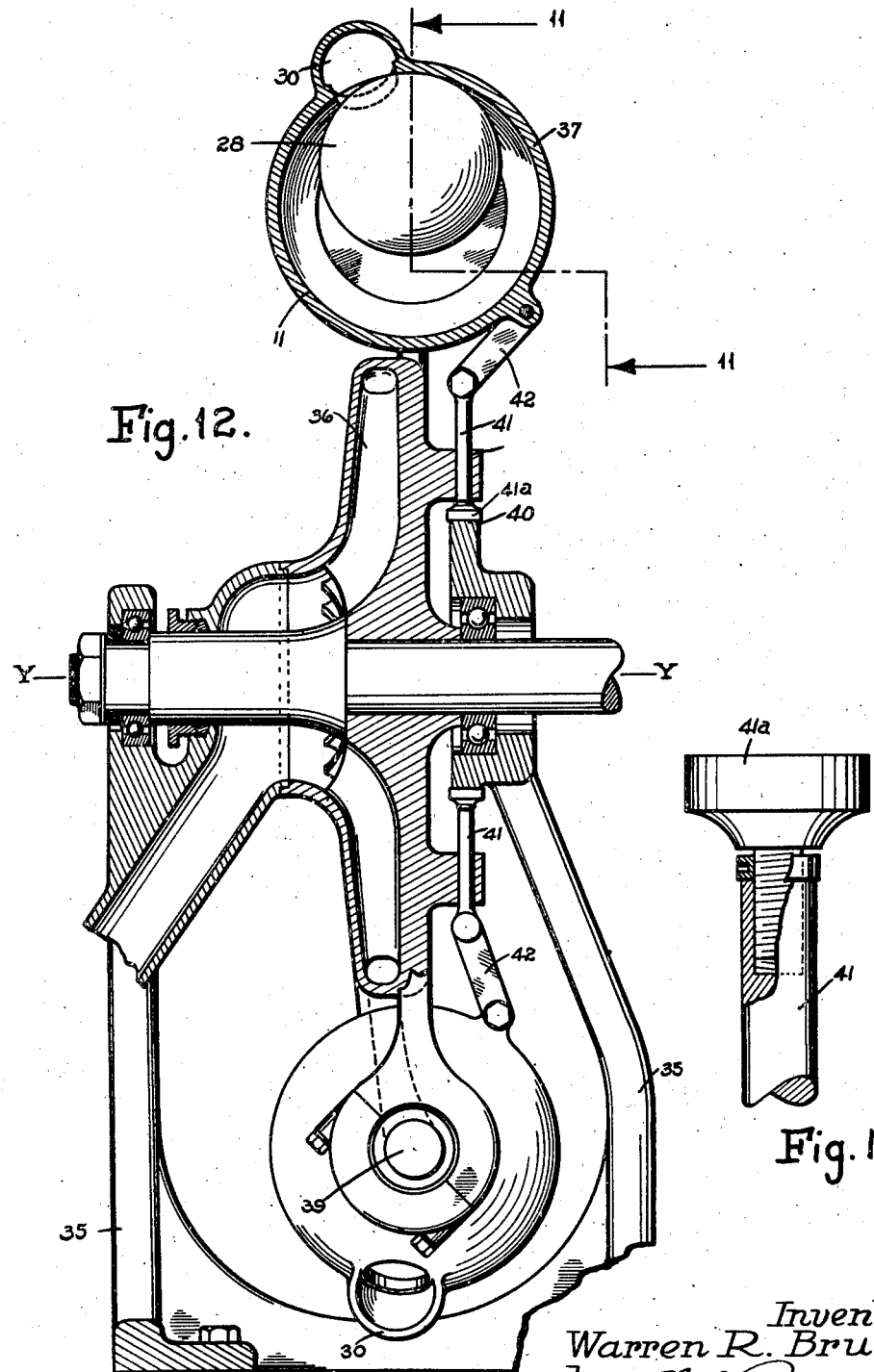

Patented June 22, 1948

2,443,948

UNITED STATES PATENT OFFICE 2,443,948

POWER PLANT

Warren R. Bruce, Portland, Oreg.

Application July 8, 1946, Serial No. 681,838

11 Claims. (Cl. 60—41)

The object of my invention is to provide a power device including a rotor, preferably having a plurality of combustion chambers, in which the flow of air fuel mixture into said combustion chamber and the discharge of the products of combustion therefrom are controlled by valves operated upon by internal forces only. In my device I utilize centrifugal force. To this end, I provide relatively massive spherical valves within a hollow spherical combustion chamber and said valves move into seating and unseating relation with the ports under the influence of centrifugal force. Said combustion chambers are rocked or rotated about axes so that said ports are moved so that said centrifugal ball valves will either roll into and seat upon said ports or roll away from said seats to uncover said ports, depending upon the angular relation of said ports with respect to said axes. That is, said valves are not operated by external connections which move them into and out of engagement with said seats. On the other hand, the combustion chambers are moved so that the mass of the valves under the influence of centrifugal force causes said valves to move into and out of seating relation with said ports. This combustion chamber and valve arrangement preferably is embodied in a rotor having spherical combustion chambers and spherical ball-type valves somewhat smaller in diameter than the combustion chamber. Centrifugal force, generated by the rotation of said rotor, will act through the center of mass of the ball valves and will cause them to assume a position upon and within the spherical interior of a combustion chamber at which said ball valves move to a point the greatest distance, in the plane of rotation of the rotor, from the axis of rotation thereof. It will remain at said extended distance as long as the rate of rotation develops sufficient centrifugal force. If each of the spherical combustion chambers is journalled upon an axis spaced from the axis of rotation of the rotor, then when the combustion chamber is rotated upon said axis the ball valves will tend to roll within the interior of the combustion chamber to tend to move to points spaced furthest from the axis of rotation of the rotor. If a port is arranged in the path of said spherical valve (so that it may be arranged at a point spaced most distant from the axis of rotation of the rotor then when said ball valve is acted upon by centrifugal force) it will tend to roll into and seat upon said port. If said port has a diameter less than that of the spherical ball valve and the combustion chamber is shifted so that said port no longer lies at the point spaced most distant from the axis of rotation of the rotor, then said ball valve will roll out of said port and uncover it. Thus, said ball valve may be caused to roll into and out of said port and to cover and uncover said port under the influence of an angular change in position of the combustion chamber.

If the products of combustion emitted from an exhaust port are directed to ducts or passageways so that said gases are emitted as a jet projecting substantially tangential to the axis of rotation of the rotor then the reaction of said jet will cause the rotor to rotate and to develop useful power.

Each combustion chamber should have an intake port as well as an exhaust port and each port should be controlled by a separate spherical ball member. Proper timing may be provided by arranging said ports so that they assume diverging angles with respect to each other so that the air fuel mixture may be caused to pass through an operating cycle of intake, ignition, combustion, expansion, discharge and scavenging of burned gases.

Further details of a power device embodying my invention and other features and the mode of operation thereof are hereinafter described with reference to the accompanying drawings, in which.

Figure 4:
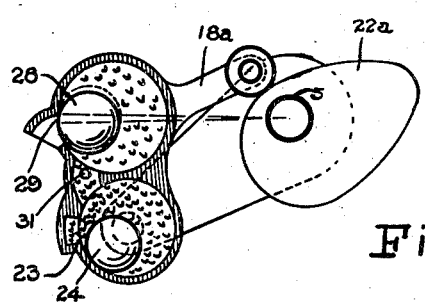
Figure 5:
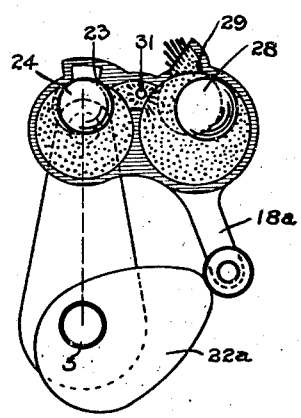
Figure 6:
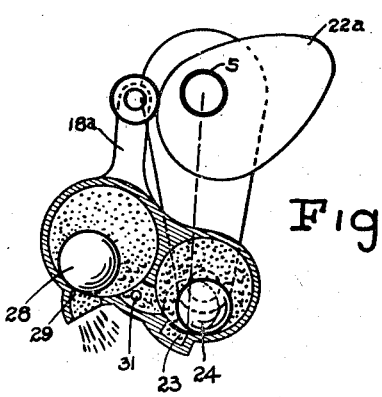
Figure 10:
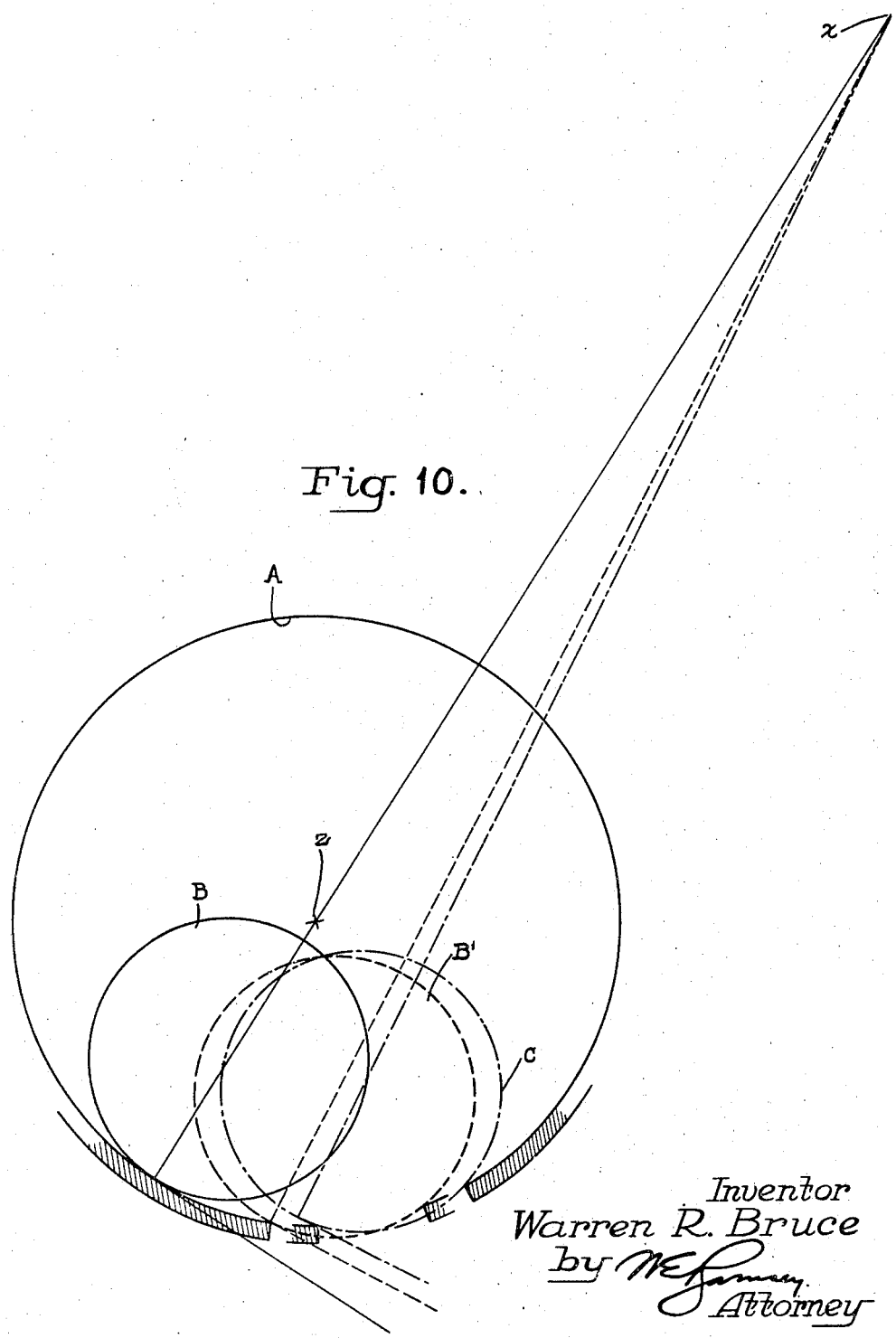

Figs. 4, 5 and 6 are diagrammatic illustrations of sequential operations and the relation of intake and discharge spherical control valves to their related ports during an operating cycle, Fig. 4 shows the arrangement of the ports at the beginning of the compression phase of an operating cycle, Fig. 5 shows the arrangement of the ports when the products of combustion are being exhausted, and Fig. 6 illustrates the arrangement of the ports toward the end of the exhaust phase and at the commencement of the scavenging phase;

Fig. 7 is a developed diagrammatic illustration of the arrangement of an intake valve and its related port in a complete intake cycle, said figure shows the relationship of a control cam during said operating cycle with the followers controlling the angular position of the combustion chamber with respect to its axis of oscillation or rotation;

Fig. 8 is a similar diagrammatic view of said parts illustrating the exhaust valve and related port in a combustion chamber treated in a manner similar to the parts shown in Fig. 7;

Fig. 9 is an enlarged diagrammatic view of a typical combustion chamber and a spherical valve arranged therein illustrating the relation of the spherical valves at a port as they exist immediately after uncovering said valve port; the position of the spherical valve immediately prior thereto is indicated in dotted outline;

Fig. 10 is a diagrammatic view illustrating the angular relation of the combustion chamber port and a related valve as said combustion chamber and its port are rotated to unseat a valve, the angular rotation of said ports being diagrammatically illustrated by the several radii of the arc swung from the axis of rotation of the rotor;

Fig. 11 illustrates a modification of my invention in which the spherical ball valves in a combustion chamber are spaced radially about the axis of rotation of the rotor and in which the combustion chambers rotate upon axes normal to the axis of rotation of the rotor, portions of one combustion chamber being shown broken away to disclose details thereof, the section through said combustion chamber being taken substantially on the line 11—11 in Fig. 12;

Fig. 12 is a sectional view taken substantially on the line 12—12 in Fig. 11; and Fig. 13 is a fragmentary detail of a cam follower, a portion being shown in section to illustrate details thereof.

My invention is illustrated in a direct rotary power plant in which the products of combustion of an air-fuel mixture are used directly for driving the rotor. In this I make use of the principle of the reaction to a jet. In said power plant a completely enclosed combustion chamber is provided into which compressed fuel and air are introduced and where combustion occurs. In said power plant consideration is given to the quick opening of valves which promote quick entry and quick release of fluids to and from the combustion chamber, respectively. To this end, said valves, and particularly the exhaust valve, are opened as a result of internal forces only. In a rotary engine or power plant this is accomplished by making use of centrifugal force.

In such power plant a rotor 1 is journalled in bearings 2 and 3 and is supported between spaced frame members 4. Preferably, a power take-off shaft 5 is connected directly to the rotor. Said rotor preferably is of skeleton form to reduce mass and air resistance and preferably a plurality of combustion chambers are carried by said rotor adjacent the periphery of the rotor at such a point where the combustion chambers move about a circle having a substantial radius. The combustion chambers are arranged in this manner because I wish to take advantage of centrifugal force to open and close the valves in said combustion chamber, as has been commented upon, and as will be pointed out in greater detail.

Figure 1:
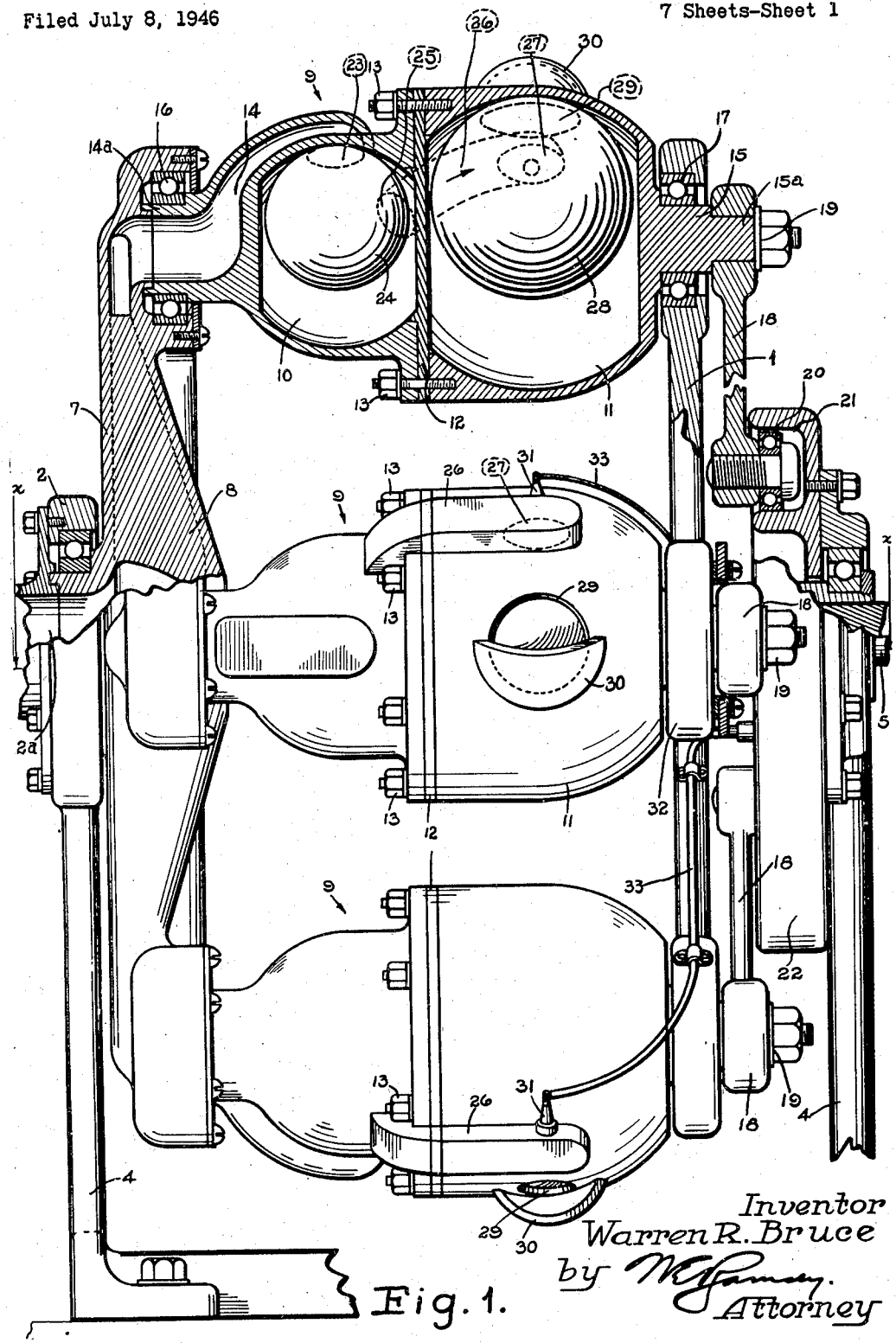
Fig. 1 is a side elevation of the rotor of an engine embodying my invention, portions of one combustion chamber and inlet passageways and control mechanism therefor being shown broken away to disclose details of construction.

Said combustion chambers preferably are spaced equidistantly about the axis of rotation x—x of the rotor (see Fig. 1). In the drawings I have shown four combustion chambers. This is merely an arbitrary number and any number might be selected consistent with power requirements and design. Inasmuch as a single control member, such as a cam, is provided it is desirable that they should fire in sequence and it is desirable that they be spaced at uniform intervals so that the power output will be substantially continuous and uniform. That is, it should be as free from pulsation as possible.

In a spark ignited power plant a mixture of air and fuel is admitted through the hollow bore 2a of the bearing 2. In a Diesel-type engine, of course, merely air would be admitted under pressure at this point. Communicating with said hollow bore is a blower, the casing 7 of which is provided with radially disposed vanes 8 for compressing the air or the combustible mixture and feeding it through intake passageways leading to the separate combustion chambers. That is, said blower chamber defines a manifold and vanes therein and the rotation thereof tend to charge the air or the combustible mixture and to direct it under substantial pressure to the separate combustion chambers spaced radially about the rotor. Inasmuch as each of the combustion chambers is similar, if not identical, to the others, only one will be described and it is to be understood that the others are substantially identical thereto. Said combustion chambers, not only form a confined and restricted area in which the air-fuel mixture is ignited, burned and expanded but also said combustion chambers comprise valve chambers for controlling the flow of air and fuel into the combustion chambers and the discharge of the products of combustion therefrom.

Said combustion chambers or valve assemblies will be given the general designation of 9. They preferably are elongated to accommodate both intake and discharge valves. Extending across the minor axis of a somewhat elliptical unit 9 is a partition 12 which provides the combustion chamber with two compartments, one an intake valve compartment 10 and the other an exhaust valve compartment 11. It is desirable that said compartments be more or less spherical in section, at least those sections taken on planes normal to the axis of rotation of the rotor are rounded. To promote ease and precision of manufacture I deem it desirable that said combustion chamber be made of two separable halves bolted together by bolts or studs 13 with the partition 12 held between the abutting faces of said parts.

The engine illustrated is of the spark ignited type and, thus, will be described in that manner. It is to be understood that I use this type of engine only for illustration and it is not to be deemed limited thereto. An air-fuel supply passageway 14 leads from the blower casing 7 to an intake port opening into the intake valve compartment 10. The walls of said intake passageway 14 constitute one of a pair of trunnions upon which the combustion chamber element is journalled for rotation about an axis extending longitudinally of said valve assembly, that is normal to the plane of the partition 12. The other trunnion 15 is axially alined therewith and is arranged at the opposite side of said power unit. The intake passageway has a hub 14a which is carried by an anti-friction bearing 16 at the left-hand side of the combustion chamber illustrated in Fig. 1. The trunnion 15 is carried by an anti-friction bearing 17, at the other or right-hand side of the combustion chamber as shown in said figure.

The trunnion 15 has an axial projection 15a and to said projection a rocker arm 18 is secured by a nut-and-washer fastening element 19. Said rocker arm carries a roller 20 at its free end and said roller engages an annular non-circular track 21 formed upon a cam element 22. Said cam element and its track are common to all of the power units spaced about the rotor and each of said combustion chambers or power units has a rocker arm and roller which rotate, rock or oscillate its power unit about said axis which extends longitudinally through the trunnions 14 and 15 and through their bearings which support them. It is, thus, to be noted that the rotor carrying with it the several power units rotates about an axis $x$—$x$ extending axially through the bearings 2 and 3 in the frame members 4. Each of the valve assemblies or power units is journalled about the periphery of said rotor and rocks or oscillates, that is, rotates one way and then the other under the action of rocker arms which engage a cam common to all of the devices and thus said valve assemblies are rotated back and forth in sequence as said rotor turns about the axis $x$—$x$.

I will next describe the construction of each of the so-called valve assemblies or power units with which my invention is particularly and specifically concerned. Each has an air-fuel supply passageway 14 leading into the intake valve compartment 10 of a combustion chamber. The inner or discharge end of the passageway 14 as it discharges into said compartment 10 terminates in a port 23. This port is adapted to be covered and uncovered by a spherical ball 24 arranged within the valve chamber. Said spherical ball valve 24 is substantially smaller in diameter than that of the intake valve compartment 10 so that it may roll freely upon the curved inner surface of said intake valve compartment. Said spherical ball valve 24, however, is rather large and preferably is made of some hardened metal, not only to provide substantial mass therein but also to enable it to maintain its smooth spherical exterior and thus to seat closely and tightly over the port 23. Although the valve assembly is susceptible of being rotated throughout 360° of rotation, it is actually rocked only a few degrees during an operating cycle.

Inasmuch as the spherical ball valve 24 is a free body it will tend to move under the influence of centrifugal force to a point in the intake valve compartment 10 where it will be spaced the greatest distance, in the plane of rotation, from the axis of rotation $x$—$x$. It will tend to remain at rest as long as centrifugal force is of substantially greater amplitude than the force of gravity.

Leading from the intake valve compartment about the partition 12 is a transverse passageway 26. The inner end thereof 25 opens into the intake valve compartment 10 and the other end communicates with the exhaust valve compartment 11. The principal purpose of the partition 12 and the transverse passageway about it it simply to provide a means for preventing the rapid passage of compressed air-fuel mixture directly from the intake port 23 to the discharge port 25 in the exhaust valve compartment, in which exhaust port 29 is covered and uncovered by the spherical ball element 28 which is the exhaust valve.

The spherical ball valve 28 is also a freely rolling body within the exhaust valve compartment 11, and operates in the same manner as does the spherical ball valve 24 heretofore described. Said intake port 23 and the exhaust port 29 are spaced radially in a plane normal to the rock axis of the valve assembly 9. This promotes proper co-related action of the intake and exhaust valves and a proper sequence of operation in the intake of a combustible mixture and the burning, discharge and scavenging thereof.

Partially overlying said exhaust port 29 and being disposed obliquely thereto is a baffle or deflector 30. Thus, gases discharged from the port 29 strike said baffle or deflector and the jet is discharged substantially tangentially to the circular course in which the valve assemblies rotate to produce a reaction to rotate the rotor about its axis $x$—$x$.

Figure 2:
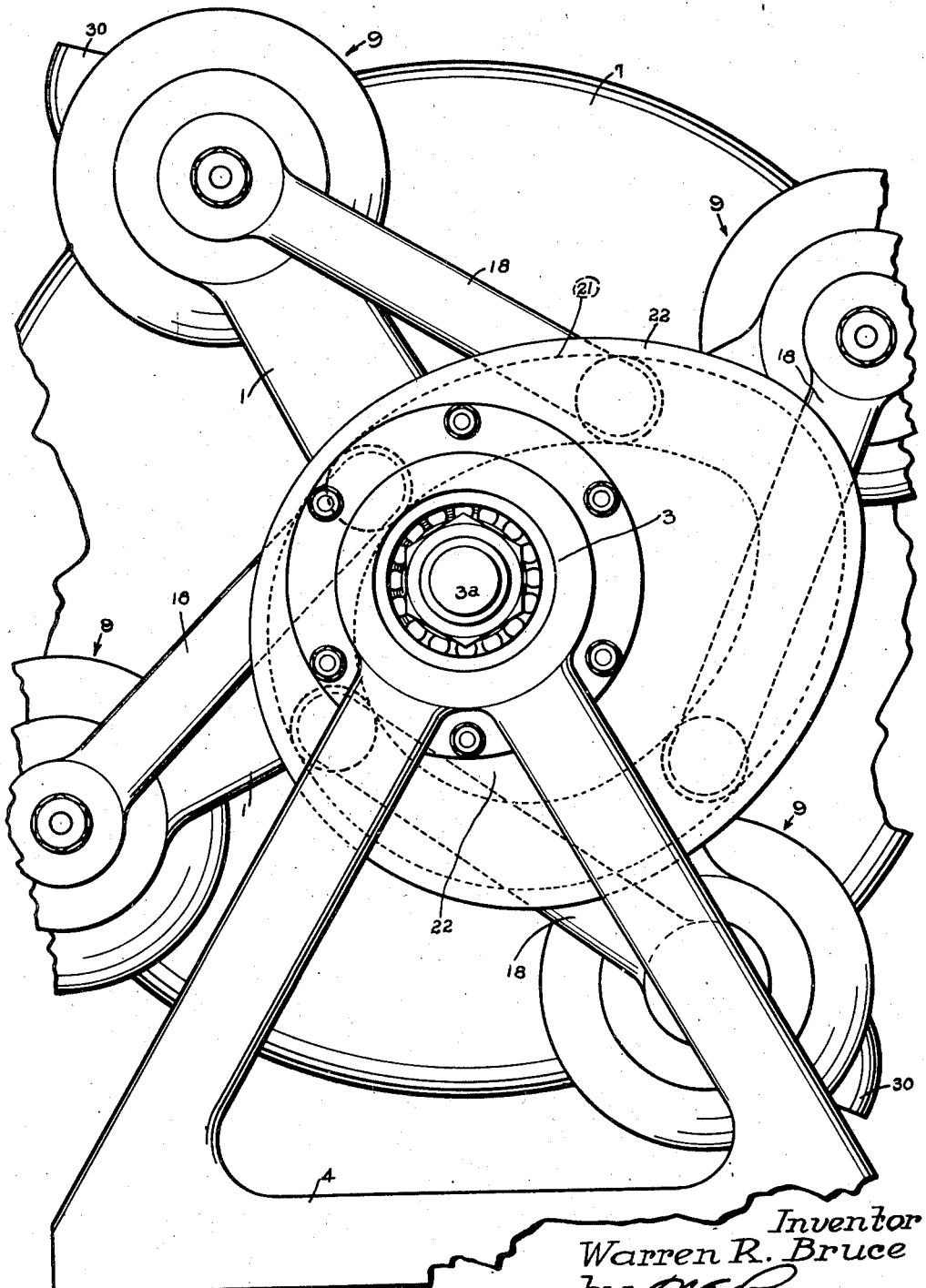
Fig. 2 is an end elevation of said structure shown somewhat fragmentarily, illustrating the manner in which the control elements rock the combustion chambers upon angularly spaced axes.

Although the baffles or deflectors 30 are shown integral with the valve assemblies it is easily understandable that they might be detachably secured thereto and be adjustable so that they could deflect said jet in the opposite direction so as to drive the rotor in the opposite direction by reaction. That is to say, the products of combustion discharged from the valve assemblies tend to react and drive the power unit so as to rotate the rotor counter-clockwise as said device is viewed in Fig. 2. If said jet were reversed by reversing the baffle or deflector then said jet would tend to leave the valve assembly 9 tangentially in the opposite direction so as to drive the rotor clockwise.

As I have stated, my device is not limited to a spark ignited internal combustion engine but I have so illustrated it in my drawings. That is, a spark plug 31 opens into the passageway 26 adjacent the discharge end of said passageway and is adapted to ignite a combustible air-fuel mixture as it flows through the passageway 26 and into the exhaust valve compartment 11. A timer 32 causes high tension electric current to flow through ignition wires 33 at the commencement of the firing or power portion of the operating cycle of each of the power units. This preferably commences at a point where the spherical valve 28 covering the exhaust port 29 just tends to roll from and thus uncover said exhaust port.

This is diagrammatically illustrated in Fig. 9. The position of the exhaust valve 28 is shown as it has been moved out of covering relation with the exhaust port 29. That is, the spherical exhaust valve 28 is illustrated in dotted outline in the position it assumed as the valve assembly is rocked through the arc defined by the lines A'—A². When the line A' extended from the axis of rotation of the rotor through the center of mass of the spherical exhaust valve 28 said valve was at the balancing point. If at said point a spark from the spark plug 31 is induced the consequent ignition of the air fuel mixture, the burning and the rapid expansion thereof will cause a puff to occur which would tend to accelerate the exhaust valve 28 moving from the point where it is shown in dotted line to the point where it is shown in full lines. Of course, this is aided by the continued rotation of the valve assembly 9 so that the line A² passes from the axis of rotation through the center of mass of said spherical exhaust valve 28. I preferably cause the walls of the passageway to extend beyond the outline of the exhaust valve compartment, as is illustrated in Fig. 9, and thus there is a restricted aperture from said passageway 26 directed toward the adjacent side or face of the spherical exhaust element 28. This tends to direct the puff or blast of expanding gases to perform this function more ably. That is, the rapid expansion of gases initiated by the spark of the plug 31 tends to give the spherical exhaust valve 28 a lateral thrust to accelerate its movement and to uncover said port 29 more rapidly. The rapid opening of the port 29 promotes the development of a full jet of exhausting gases outwardly through said port to react with and to rotate the rotor, as has been heretofore described.

Figure 3:
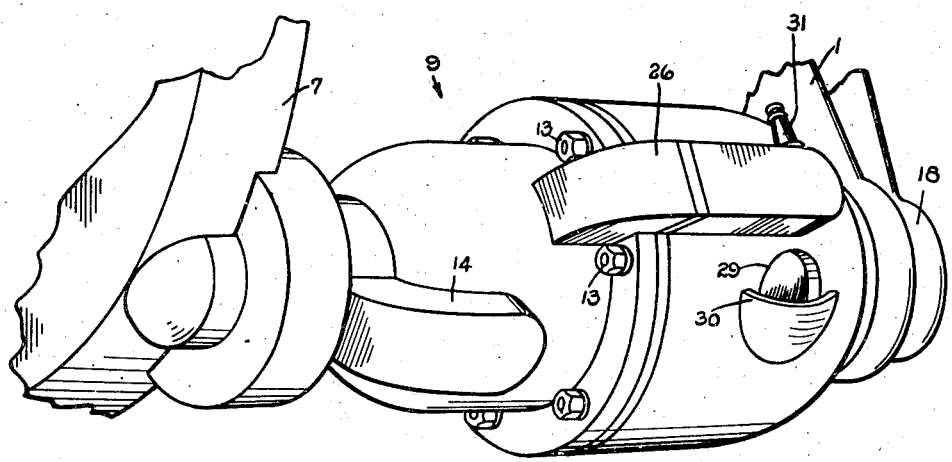
Fig. 3 is a perspective view of one of said combustion chambers showing the exterior thereof.

In Fig. 3 I have illustrated the physical external portions of the parts of the valve assembly 9 and attention is directed to the fact that the passageway 14 leading into the intake valve compartment 10, and the passageway 26 extending about the partition 12, lie outside of the general curvature of the valve assembly. This permits relatively large valve compartments 10 and 11 to be afforded without increasing the diameter and mass of said compartments unduly. In rotary power plants developing centrifugal force of substantial amplitude the speed of rotation is correspondingly high and large massive bodies develop gyratory factors if they are not in exact balance.

In Figs. 4, 5 and 6, the arrangement of the valves in the intake compartment and the exhaust compartment are shown with respect to a cam element for rocking them about a central axis. The arrangement of the intake and exhaust compartments does not correspond to the arrangement shown in Fig. 1, for example. There said compartments lie in axial alinement about a common axis while in the schematic arrangement shown in Figs. 4, 5 and 6, said compartments lie alongside each other. This is for explanatory purposes only.

In Fig. 4 the compartments and the valves therein are shown as they lie during the intake portion of an operating cycle. The spherical exhaust valve 28 is shown seated upon port 29 while the intake valve 24 is shown unseated with relation to its intake port 23. In Fig. 5 the cam 22a has moved the rocker arm 18a so that the intake valve 24 is seated upon its port 23 and the exhaust valve 28 is moved into uncovering position with regard to the discharge port 29. In Fig. 6 both of said spherical valves are unseated from their ports, as in the scavenging portion of the power cycle where fresh air is admitted to sweep out substantial portions of the products of combustion from the exhaust valve compartment 11.

In Fig. 7 I illustrate the intake valve compartment 10 and its operating cycle developed through 360° of angular rotation about the axis x—x. The several illustrations of the valve compartment 10 have been shown at approximately 30° intervals. These might be said to correspond to the spacing of the figures on a clock face and this promotes ease of explanation. The ball valve 24 moves into uncovering relation with the intake port 23 some point between five and six o'clock and remains open until between twelve and one o'clock. During this portion of the cycle the air-fuel mixture is permitted to flow through the intake port 23 into the intake valve compartment 10 through the transverse passageway 26 and into the exhaust valve compartment 11. From one o'clock to five o'clock the ball valve covers the port 23 and during this portion of the cycle of rotation the gases are ignited, burned, expanded and exhausted. In said Fig. 7 the cam 22 is illustrated and the angular relationship of the cam followers, roller and track is illustrated.

In Fig. 8 the same relative arrangement of the exhaust valve compartment and corresponding angular positions of the valves are maintained. That is, the illustration of the exhaust compartment at two o'clock corresponds to the intake compartment at two o'clock and so on throughout the several illustrations. The spherical exhaust valve 28 is cut off from the atmosphere somewhere between seven and eight o'clock. That is, the valve 28 seats upon the port 29. This is the compression portion of the cycle and continues to just beyond one o'clock. At this point the spherical exhaust valve 28 is moved toward the right by the combined action of centrifugal force and the expansion of the gases applied laterally to the left-hand side or face thereof. This opens the port 29 and permits the gases to escape rapidly from two o'clock to about seven o'clock. An examination of the several views in Figs. 7 and 8 illustrates the fact that scavenging occurs from six o'clock to slightly past seven o'clock.

In Fig. 10 I have attempted to show schematically the manner in which a spherical valve moves from unseating position to seating position. Consider a combustion chamber whose interior is spherical in shape revolving about a central axis at a constant radius and at a fairly constant and high rate of rotation. Inside the spherical chamber A is a spherical ball B. Said spherical ball is of somewhat smaller diameter than the combustion chamber. Centrifugal force acting through the center of gravity, as shown in unbroken line, will tend to cause it to seek a position on the spherical interior of the combustion chamber where it will be spaced the greatest possible distance in the plane of rotation from the center of rotation $x$. It will remain in this position as long as the rate of rotation is sufficient to generate centrifugal force of substantially greater amplitude than that of gravity. Consider that the combustion chamber is rotatably mounted upon an axis extending through the point Z. This axis lies in a plane tangential to the plane of rotation of the entire rotor. Thus, the angular position of the combustion chamber with respect to its own axis can be altered and when it is so altered the spherical valve will tend to roll on the interior surface of the combustion chamber in a direction where it will tend to extend the distance of its center of gravity from the center of rotation. If, thus, there is introduced a circular port in the combustion chamber wall which is intercepted by the circular path on which the ball rolls then said ball will tend to enter said port if it lies on a radius passing from the center of rotation X through the center of mass of the ball and through the port in question. Thus, the spherical valve or ball will seat on said port and seal it if said port has a diameter somewhat smaller than that of the ball. In this manner said valve can be made to roll into and out of the port by changing the angular position of the combustion chamber by rotating it on its axis Z and varying the angular position of the port with respect to the radius of rotation for the rotor generally and about which the entire combustion chamber swings. In said Fig. 10 I have shown various radii and lines normal thereto representing tangents to the spheres as they are arranged when rolling from the position shown in said figure in full lines to the position they assume in seating position. This is shown in broken line indicated as B'. The arrangement of the valve in the other valve compartment is illustrated by broken outline C. Inasmuch as the valve assembly is an integral whole, that is it is bolted together and operates as a solid integral structure, said Fig.

10 illustrates the manner in which the intake and the exhaust valve may move under the influence of centrifugal force in timed relation. This produces an operating cycle without the necessity of providing mechanical structures for moving said valves into and out of seating and unseating relation with respect to their ports. This action is produced wholly through the influence of internal forces only. In this case I make use of centrifugal force as said internal moving force.

In Figs. 11 and 12 I show a modification of my invention in which the valve chambers lie side by side in the plane of rotation of the rotor. In said modification the rotor 34 is mounted between frame sides 35 in substantially the same manner as in the structure first described. An air-fuel mixture or air under compression flows to the combustion chambers through a passageway 36. It preferably is substantially compressed either by a fan, supercharger, air scoop or other device used for supplying air under pressure to a power plant. The valve assembly 37 is carried by trunnions 38 and 39, as in the previous embodiment, and the valve assembly shown in section is adapted to rotate about the axis E—E while the rotor revolves about the axis Y. Said axes are normal to each other. Thus the cam 40 may be arranged directly to actuate a follower 41 which acts through a link 42 to rotate said valve assembly. The follower preferably has an adjustable head 41a so that clearances may be adjusted and maintained to an operating minimum.

I have not attempted to show in the drawings or to describe in the specification all of the accessory equipment, such as the fuel preparing and charging mechanism, starters and the like because these will be self-suggestive to a person skilled in the art. I have attempted to illustrate only the simplest form of my invention in making this disclosure. My invention in its essence is directed to the valve structure and the addition of this supplementary matter it is believed would confuse rather than aid the understanding of the essential portions of my invention.

I claim:

1. In a rotatable power device, a frame, a rotor rotatably mounted therein about a central axis and carrying a combustion chamber at a point rotatably mounted on an axis spaced from said central axis, a port in said combustion chamber opening to the atmosphere, a massive valve element adapted to seat automatically on said port when said port and the center of mass of said valve are in radial alinement with said central axis, means for rotating said combustion chamber so that said port moves into and out of said radial alinement, whereby the angular position of said combustion chamber with respect to said distant axis controls the seating and unseating of the valve element therein.

2. In a rotatable power device, a frame, a rotor rotatably mounted therein about a central axis and carrying a plurality of spaced combustion chambers at points rotatably mounted on axes spaced from said central axis, a port in each of said combustion chambers opening to the atmosphere, a massive valve element in each combustion chamber adapted to seat automatically on said port when said port and the center of mass of said valve are in radial alinement with said central axis, means for rotating each of said combustion chambers so that said ports move into and out of said radial alinement, whereby the angular position of each of said combustion chambers with respect to said distant axes controls the seating and unseating of the valve element therein.

3. In a rotatable power device, a frame, a rotor rotatably mounted therein about a central axis and carrying a plurality of spaced combustion chambers at points rotatably mounted on axes spaced from said central axis, a port in each of said combustion chambers opening to the atmosphere, a massive valve element in each combustion chamber adapted to seat automatically on said port when said port and the center of mass of said valve are in radial alinement with said central axis, means for rotating each of said combustion chambers in sequence so that said ports move into and out of said radial alinement, whereby the angular position of each of said combustion chambers with respect to said distant axes controls the seating and unseating of the valve element therein.

4. In a power plant, comprising a rotor journalled for rotation about an axis, a plurality of combustion chambers carried by said rotor upon axes spaced about the axis of rotation of said rotor shaft, means and devices operatively engaging each of said combustion chambers to rock the latter about their respective axes in predetermined sequence each rotation of said rotor, and spherical ball valves in said combustion chambers and ports arranged in said combustion chambers in relation to said spherical valves, respectively, adapted to be covered and uncovered by said valves when said combustion chambers are rocked about their respective axes and said valves are affected by the centrifugal force generated by the rotation of said rotor.

5. In a power plant, comprising, a rotor journalled for rotation about an axis, a plurality of combustion chambers carried by said rotor upon axes spaced about the axis of rotation of said rotor shaft, means and devices operatively engaging each of said combustion chambers to rock the latter about their respective axes in predetermined sequence each rotation of said rotor, massive spherical ball valves in said combustion chambers and ports arranged in said combustion chambers in relation to said spherical valves, respectively, adapted to be covered and uncovered by said valves when said combustion chambers are rocked about their respective axes and said valves are affected by the centrifugal force generated by the rotation of said rotor.

6. In a power plant, comprising a rotor journalled for rotation about an axis, a plurality of combustion chambers carried by said rotor upon axes spaced symmetrically about the axis of rotation of said rotor shaft, means and devices operatively engaging each of said combustion chambers to rock the latter about their respective axes in predetermined sequence each rotation of said rotor, and spherical ball valves in said combustion chambers and ports arranged in said combustion chambers in relation to said spherical valves, respectively, adapted to be covered and uncovered by said valves when said combustion chambers are rocked about their respective axes and said valves are affected by the centrifugal force generated by the rotation of said rotor.

7. In a power plant, comprising a rotor journalled for rotation about an axis, a plurality of combustion chambers carried by said rotor upon axes spaced symmetrically at uniform radial spacing about the axis of rotation of said rotor shaft, means and devices operatively engaging each of said combustion chambers to rock the latter about their respective axes in predetermined sequence each rotation of said rotor, and spherical ball valves in said combustion chambers and ports arranged in said combustion chambers in relation to said spherical valves, respectively, adapted to be covered and uncovered by said valves when said combustion chambers are rocked about their respective axes and said valves are affected by the centrifugal force generated by the rotation of said rotor.

8. In a power plant, comprising a rotor journalled for rotation about an axis, a plurality of combustion chambers carried by said rotor about axes spaced about the axis of rotation of said rotor shaft, means and devices operatively engaging each of said combustion chambers to rock the latter about their respective axes in predetermined sequence each rotation of said rotor, spherical ball valves in said combustion chambers and ports arranged in said combustion chambers in relation to said spherical valves, respectively, adapted to be covered and uncovered by said valves when said combustion chambers are rocked about their respective axes and said valves are affected by the centrifugal force generated by the rotation of said rotor, and each combustion chamber being divided into two compartments separated by a central transverse partition.

9. In a rotor plant, comprising a rotor journalled for rotation about an axis, a plurality of combustion chambers carried by said rotor upon axes spaced about the axis of rotation of said rotor shaft, means and devices operatively engaging each of said combustion chambers to rock the latter about their respective axes in predetermined sequence each rotation of said rotor and a port and a spherical valve in each compartment, the ports being spaced radially from each other to vary the relative timing of their action with respect to the rotation of said rotor and to that of each other.

10. In a power plant, comprising a rotor journalled for rotation about an axis, a plurality of combustion chambers carried by said rotor upon axes spaced about the axis of rotation of said rotor shaft, means and devices operatively engaging each of said combustion chambers to rock the latter about their respective axes in predetermined sequence each rotation of said rotor, each combustion chamber being divided into two compartments separated by a central transverse partition, one of said spherical valves controlling an intake port and the other spherical valve controlling the discharge port, and a passageway extending about said central transverse partition and joining the two compartments of each combustion chamber.

11. In a power plant, comprising a rotor journalled for rotation about an axis, a plurality of combustion chambers carried by said rotor upon axes spaced about the axis of rotation of said rotor shaft, means and devices operatively engaging each of said combustion chambers to rock the latter about their respective axes in predetermined sequence each rotation of said rotor, each combustion chamber being divided into two compartments separated by a central transverse partition, one of said spherical valves controlling an intake port and the other spherical valve controlling the discharge port, a passageway extending about said central transverse partition and joining the two compartments of each combustion chamber, an igniter in said passageway, and the discharge end of said passageway sweeping across the discharge port thereby ignited air-fuel mixture in said passageway will tend to unseat the spherical valve seated upon said discharge port.

WARREN R. BRUCE.